United States Patent
Tong

(10) Patent No.: US 12,323,084 B2
(45) Date of Patent: Jun. 3, 2025

(54) POWER TOOL

(71) Applicant: Nanjing Chervon Industry Co., Ltd., Nanjing (CN)

(72) Inventor: Wenkang Tong, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 68 days.

(21) Appl. No.: 18/454,246

(22) Filed: Aug. 23, 2023

(65) Prior Publication Data
US 2024/0079977 A1 Mar. 7, 2024

(30) Foreign Application Priority Data
Sep. 2, 2022 (CN) .......................... 202211069945.X

(51) Int. Cl.
*H02P 6/24* (2006.01)
*B25F 5/00* (2006.01)
*H02P 3/22* (2006.01)

(52) U.S. Cl.
CPC .................. *H02P 6/24* (2013.01); *H02P 3/22* (2013.01); *B25F 5/00* (2013.01)

(58) Field of Classification Search
CPC ...... H02P 6/24; H02P 3/22; H02P 3/18; H02P 6/15; H02P 6/157; H02P 29/0241; H02P 6/16; B25F 5/00; H02K 11/20; H02K 11/21; H02K 11/33
USPC .......................................... 318/17, 599, 560
See application file for complete search history.

(56) References Cited

U.S. PATENT DOCUMENTS

| | | | |
|---|---|---|---|
| 6,034,493 A | 3/2000 | Boyd | |
| 8,198,839 B2* | 6/2012 | Katou | B25F 5/02 |
| | | | 388/937 |
| 9,197,146 B2* | 11/2015 | Mergener | H02P 6/14 |
| 9,923,492 B2 | 3/2018 | Chen | |
| 10,348,227 B2* | 7/2019 | Ichikawa | H02K 11/215 |
| 2015/0137717 A1 | 5/2015 | Ishikawa | |
| 2020/0130127 A1 | 4/2020 | Yoshinari | |
| 2020/0343840 A1 | 10/2020 | Vanko | |

FOREIGN PATENT DOCUMENTS

WO 2022099669 A1 5/2022

OTHER PUBLICATIONS

Extended European Search Report from European application No. 23188563.3, dated Dec. 22, 2023, 8 pp.

* cited by examiner

*Primary Examiner* — David Luo
(74) *Attorney, Agent, or Firm* — Greenberg Traurig, LLP

(57) ABSTRACT

A power tool includes: an electric motor including a rotor and multi-phase stator windings; multiple power switches arranged between a power supply and the electric motor and including multiple high-side switches and multiple low-side switches; a parameter detection device configured to detect an electrical parameter of the electric motor; and a controller configured to output a control signal to control the multiple power switches and at least configured to control the electric motor to brake. The controller is further configured to: determine, according to the electrical parameter, a brake timing for braking the electric motor and start controlling the electric motor to brake when the brake timing arrives.

17 Claims, 7 Drawing Sheets

POWER TOOL

RELATED APPLICATION INFORMATION

This application claims the benefit under 35 U.S.C. § 119(a) of Chinese Patent Application No. 202211069945.X, filed on Sep. 2, 2022, which application is incorporated herein by reference in its entirety.

BACKGROUND

During the use of a power tool, the shaft of an electric motor may be stuck due to an excessive load, a mechanical reason of the power tool, or the like, that is, the rotor of the electric motor is locked. For example, the rotor of the electric motor may be locked when a nail is struck to a bottom by an electric drill. Generally, when the rotor of the electric motor is locked, power elements in a control circuit are typically turned off directly so that locked rotor protection is performed on the electric motor. However, for a power tool which has a relatively strong current when the rotor is locked, if all the power elements in the control circuit are directly turned off so that the locked rotor protection is performed, currents of inductors in the electric motor may freewheel to a battery pack because bus freewheeling occurs. Thus, a voltage is caused to increase, damaging the power elements.

SUMMARY

A power tool includes: an electric motor including a rotor and multi-phase stator windings; multiple power switches arranged between a power supply and the electric motor and including multiple high-side switches and multiple low-side switches; a parameter detection device configured to detect an electrical parameter of the electric motor; and a controller configured to output a control signal to control the multiple power switches and at least configured to control the electric motor to brake. The controller is further configured to: determine, according to a first electrical parameter, whether the electric motor needs to be braked, determine a brake timing according to a second electrical parameter when it is determined that the electric motor needs to be braked, and start controlling the electric motor to brake when the brake timing arrives.

In an example, the second electrical parameter is different from the first electrical parameter.

In an example, the first electrical parameter includes a phase current, a phase voltage, or output power of the electric motor.

In an example, the second electrical parameter includes at least a rotation direction of the electric motor and a rotor position of the electric motor.

In an example, the controller is configured to: determine commutation sequence of the stator windings and a commutation interval of the stator windings according to the rotation direction and the rotor position; determine a next commutation interval of the commutation interval based on the commutation sequence; and determine the brake timing according to the correspondence relationship between a switching mode in which switching to the next commutation interval is performed and a regulation mode of the control signal.

In an example, the regulation mode includes a first regulation mode for regulating a pulse-width modulation (PWM) state of a high-side switch and a second regulation mode for regulating a PWM state of a low-side switch.

In an example, the controller is configured to control the electric motor to brake when the regulation mode is the first regulation mode and the high-side switch is switched to the on/off state such that the interval switching from the commutation interval to the next commutation interval is implemented.

In an example, the controller is configured to control the electric motor to commute to the next commutation interval when the regulation mode is the first regulation mode and the low-side switch is switched to the on/off state such that the interval switching from the commutation interval to the next commutation interval is implemented, and brake the electric motor after a preset period.

In an example, the controller is configured to control the electric motor to brake when the regulation mode is the second regulation mode and the low-side switch is switched to the on/off state such that the interval switching from the commutation interval to the next commutation interval is implemented.

In an example, the controller is configured to control the electric motor to commute to the next commutation interval when the regulation mode is the second regulation mode and the high-side switch is switched to the on/off state such that the interval switching from the commutation interval to the next commutation interval is implemented, and brake the electric motor after a preset period.

In an example, a brake operation with which the controller controls the electric motor to brake includes at least one of reducing a duty cycle of the control signal, controlling a stator winding to be short-circuited so as to cause the electric motor to brake, and controlling the multiple power switches to be turned off so as to cause the electric motor to brake by coasting.

In an example, the brake timing includes a time point, a moment, or a period when the controller outputs a brake signal to brake the electric motor.

In an example, the preset period is freewheeling time during the commutation of the stator windings.

In an example, the preset period is shorter than freewheeling time during the commutation of the stator windings.

A power tool includes: an electric motor including a rotor and multi-phase stator windings; multiple power switches arranged between a power supply and the electric motor and including multiple high-side switches and multiple low-side switches; a parameter detection device configured to detect an electrical parameter of the electric motor; and a controller configured to output a control signal to control the multiple power switches and at least configured to control the electric motor to brake. The controller is further configured to: determine, according to the electrical parameter, a brake timing for braking the electric motor, and start controlling the electric motor to brake when the brake timing arrives.

A power tool includes: an electric motor including a rotor and multi-phase stator windings; multiple power switches arranged between a power supply and the electric motor and including multiple high-side switches and multiple low-side switches; a parameter detection device configured to detect a rotation direction of the electric motor and a rotor position of the electric motor; and a controller configured to output a control signal to control the multiple power switches and at least configured to control the electric motor to brake. The controller is configured to: determine commutation sequence of the stator windings and a commutation interval of the stator windings according to the rotation direction and the rotor position; determine a next commutation interval of the commutation interval based on the commutation sequence; and determine a brake timing of the electric motor according to the correspondence relationship between a switching mode in which switching to the next commutation interval is performed and a regulation mode of the control signal, and start controlling the electric motor to brake when the brake timing arrives.

In an example, the regulation mode includes a first regulation mode for regulating a PWM state of a high-side switch and a second regulation mode for regulating a PWM state of a low-side switch.

In an example, the controller is configured to control the electric motor to brake when the regulation mode is the first regulation mode and the high-side switch is switched to the on/off state such that the interval switching from the commutation interval to the next commutation interval is implemented.

In an example, the controller is configured to control the electric motor to commute to the next commutation interval when the regulation mode is the first regulation mode and the low-side switch is switched to the on/off state such that the interval switching from the commutation interval to the next commutation interval is implemented, and brake the electric motor after a preset period.

In an example, the controller is configured to control the electric motor to brake when the regulation mode is the second regulation mode and the low-side switch is switched to the on/off state such that the interval switching from the commutation interval to the next commutation interval is implemented.

In an example, the controller is configured to control the electric motor to commute to the next commutation interval when the regulation mode is the second regulation mode and the high-side switch is switched to the on/off state such that the interval switching from the commutation interval to the next commutation interval is implemented, and brake the electric motor after a preset period.

The present application has the following benefits: an occasion when the power tool performs locked rotor protection is controlled so that damage to a power element can be effectively avoided and the service life of the tool is ensured.

DETAILED DESCRIPTION

Figure 1:
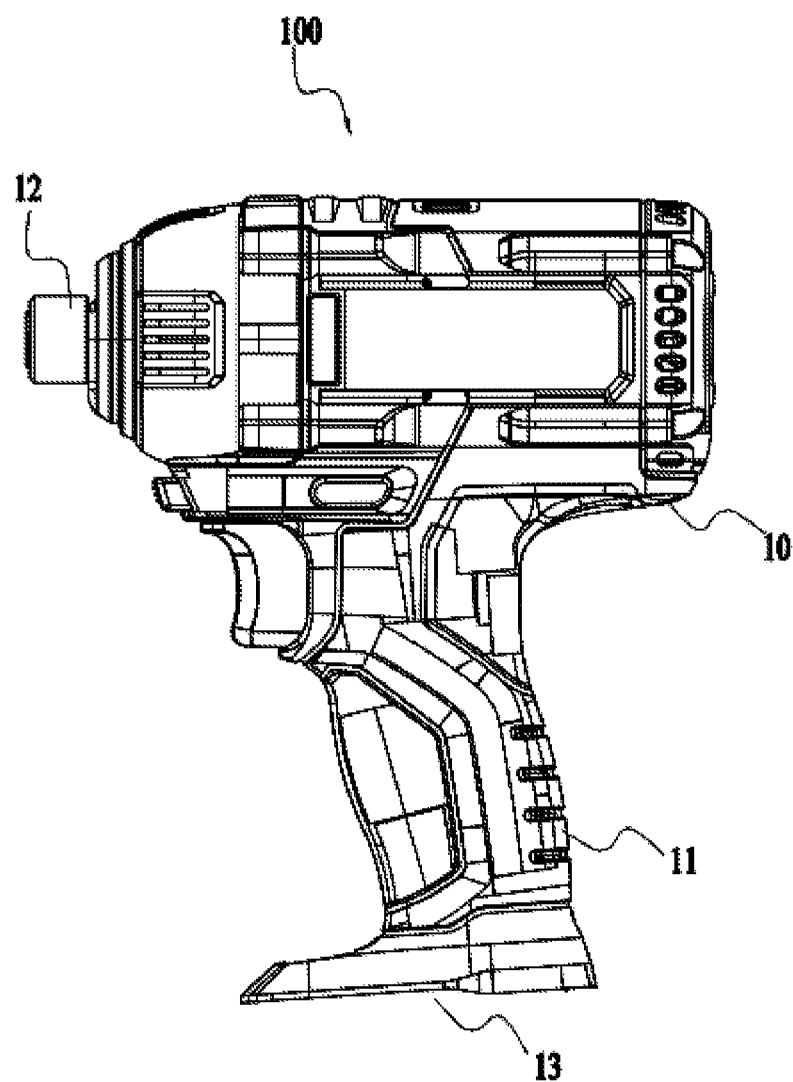
FIG. 1 is a structural view of a power tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" "and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Technical solutions of the present application are applicable to power tools including various types of power tools, for example, tools whose locked rotor protection may be triggered by strong currents like an electric drill, a circular saw, and a reciprocating saw.

Referring to FIG. 1, a power tool 100 may include a housing 10, a grip 11 formed by the housing 10, a functional accessory 12 capable of being driven by an electric motor, and a power interface 13 for accessing a power supply. Different types of power tools have different functional accessories 12, and the functional accessory 12 in this example may be a drill bit. In this example, the electric motor may be a brushless direct current (BLDC) motor. In an example, the electric motor is a brushless direct current (BLDC) motor. In an example, the electric motor is a sensorless BLDC motor. In an example, the electric motor is an outrunner. In an example, the electric motor is an inrunner. In an example, the power supply accessed by the power interface 13 may be alternating current (AC) mains or a direct current (DC) power supply device such as a battery pack.

Figure 2:
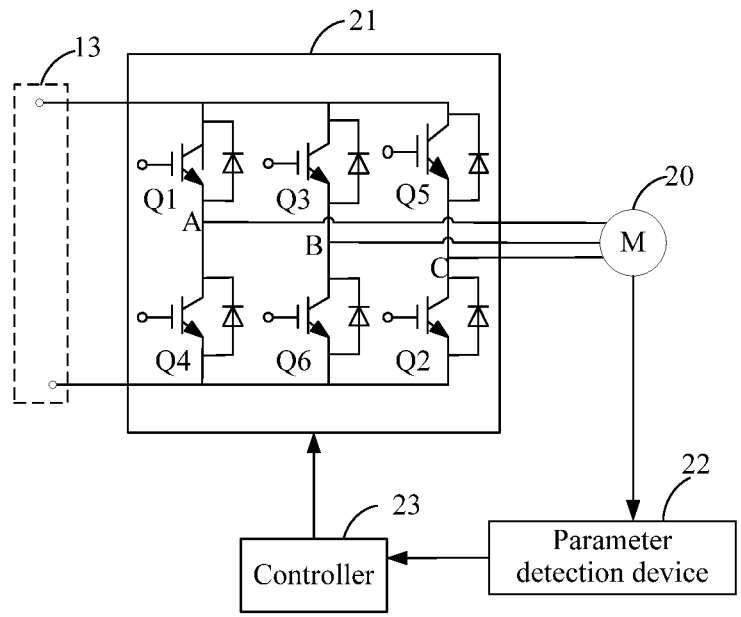
FIG. 2 is a circuit block diagram of a power tool according to an example of the present application.

In this example, referring to FIG. 2, the electric motor 20 may include three-phase stator windings, and each of the three-phase stator windings may be simply referred to as a winding or an inductor. In an example, the three-phase windings may be connected to each other in a star connection mode or a delta connection mode.

As shown in FIG. 2, in the power tool 100, a control circuit controlling the electric motor 20 to rotate may include a driver circuit 21, a parameter detection device 22, and a controller 23. The driver circuit 21 is electrically connected to the electric motor 20 and can drive the electric motor 20 to rotate. The parameter detection device 22 can detect an electrical parameter of the electric motor and transmit the electrical parameter to the controller 23. The controller 23 may output a control signal to the driver circuit 21 to change the conduction state of a switch element in the driver circuit, thereby controlling the electric motor to start, change a rotation state, brake, or the like. In an example, the control signal may be a pulse signal such as a PWM signal.

The parameter detection device 22 can detect the electrical parameter of the electric motor 20. The electrical parameter may include one or more of a phase current, a phase voltage, a rotational speed, a rotation direction, a rotor position, and the like of the electric motor. The rotation direction of the electric motor is related to commutation sequence of the windings of the electric motor, and the rotor position may also be determined by the commutation sequence. In this example, the parameter detection device 22 may include a detection element having the function of detecting multiple parameters or may include multiple detection elements detecting different electrical parameters separately. For example, a sampling resistor for detecting the phase current, a Hall element for detecting the rotor position, or the like may be included. In this example, the parameter detection device 22 is electrically connected to the controller 23 and can transmit the electrical parameter to the controller 23. In this example, other electrical connection relationships of the parameter detection device 22 in the control circuit are not limited.

The driver circuit 21 is electrically connected to the three-phase windings A, B, and C of the electric motor 20 and is configured to transmit a current inputted from the power interface 13 to the stator windings A, B, and C so as to drive the electric motor 20 to rotate. In an example, the driver circuit 21 includes multiple power switch elements Q1, Q2, Q3, Q4, Q5, and Q6. The gate terminal of each switch element is electrically connected to the controller 23 and is used for receiving a control signal from the controller 23. The drain or source of each switch element is connected to the stator windings A, B, and C of the electric motor 20. The switch elements Q1 to Q6 receive control signals from the controller 23 to change respective conduction states, thereby changing the current loaded onto the stator windings A, B, and C of the electric motor 20 by the power supply. In an example, the driver circuit 21 may be a three-phase bridge driver circuit including six controllable semiconductor power devices (such as field-effect transistors (FETs), bipolar junction transistors (BJTs), or insulated-gate bipolar transistors (IGBTs)). The preceding switch elements may be any other types of solid-state switches, such as the insulated-gate bipolar transistors (IGBTs) or the bipolar junction transistors (BJTs). In this example, the six controllable semiconductor power devices may include three high-side switches and three low-side switches. The so-called high-side switches may be power switches connected to an output loop of the positive electrode of the power supply, and the so-called low-side switches may be power switches connected to an output loop of the negative electrode of the power supply.

To drive the electric motor 20 to rotate, the driver circuit 21 has multiple driving states. The electric motor 20 may have different rotational speeds or different rotation directions in different driving states. In the present application, the process is not described in detail where the controller 23 controls the driver circuit 21 to change the different driving states such that the electric motor 20 has the different rotational speeds or the different rotation directions.

Figure 3:
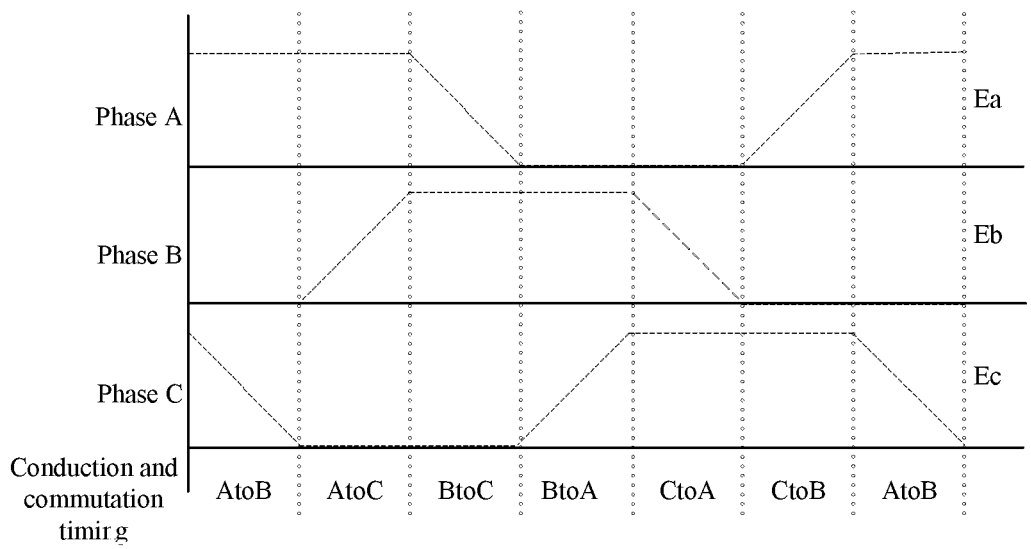
FIG. 3 is a schematic diagram showing conduction and commutation sequence of windings of an electric motor according to an example of the present application.

In an example, the driver circuit 21 typically has at least six driving states, and switching to a driving state each time corresponds to one commutation action of the windings of the electric motor. As shown in FIG. 3, a horizontal axis represents commutation points of a stator within a cycle of 360°, and a vertical axis represents back electromotive forces of the three-phase windings. In FIG. 3, a rotor rotates by 60° each time, and the electric motor commutes once. An interval from commutation of the electric motor to next commutation of the electric motor is defined as a commutation interval. As can be seen from FIG. 3, there is six-step commutation within one commutation cycle of 360°. Assuming that the electric motor rotates forward when the commutation sequence is AB-AC-BC-BA-CA-CB-AB, the electric motor rotates reversely when the commutation sequence is reversed. That is to say, the rotation direction of the electric motor has a correspondence relationship with the commutation sequence. In this example, the rotor position has a one-to-one correspondence relationship with the commutation interval. For example, when the commutation interval is AB, the rotor is in this commutation interval. Commutation occurs when the rotor rotates from a commutation interval to the next commutation interval, and the commutation may include upper-transistor switching or lower-transistor switching. An upper transistor is a high-side switch in the driver circuit 21, and a lower transistor is a low-side switch in the driver circuit 21. For example, in FIG. 3, when the commutation sequence of the windings is AB-AC-BC-BA-CA-CB-AB, the windings of the electric motor are switched from the state where the windings A and B are turned on to the state where the windings A and C are turned on, which is referred to as the lower-transistor switching, and the windings of the electric motor are switched from the state where the windings A and C are turned on to the state where the windings B and C are turned on, which is referred to as the upper-transistor switching. If the commutation sequence is reverse to that in FIG. 3, the upper-transistor switching and the lower-transistor switching are also reverse. The upper-transistor switching may be understood as the case where the conduction state of the high-side switch is switched, and the lower-transistor switching may be understood as the case where the conduction state of the low-side switch is switched.

Figure 4:
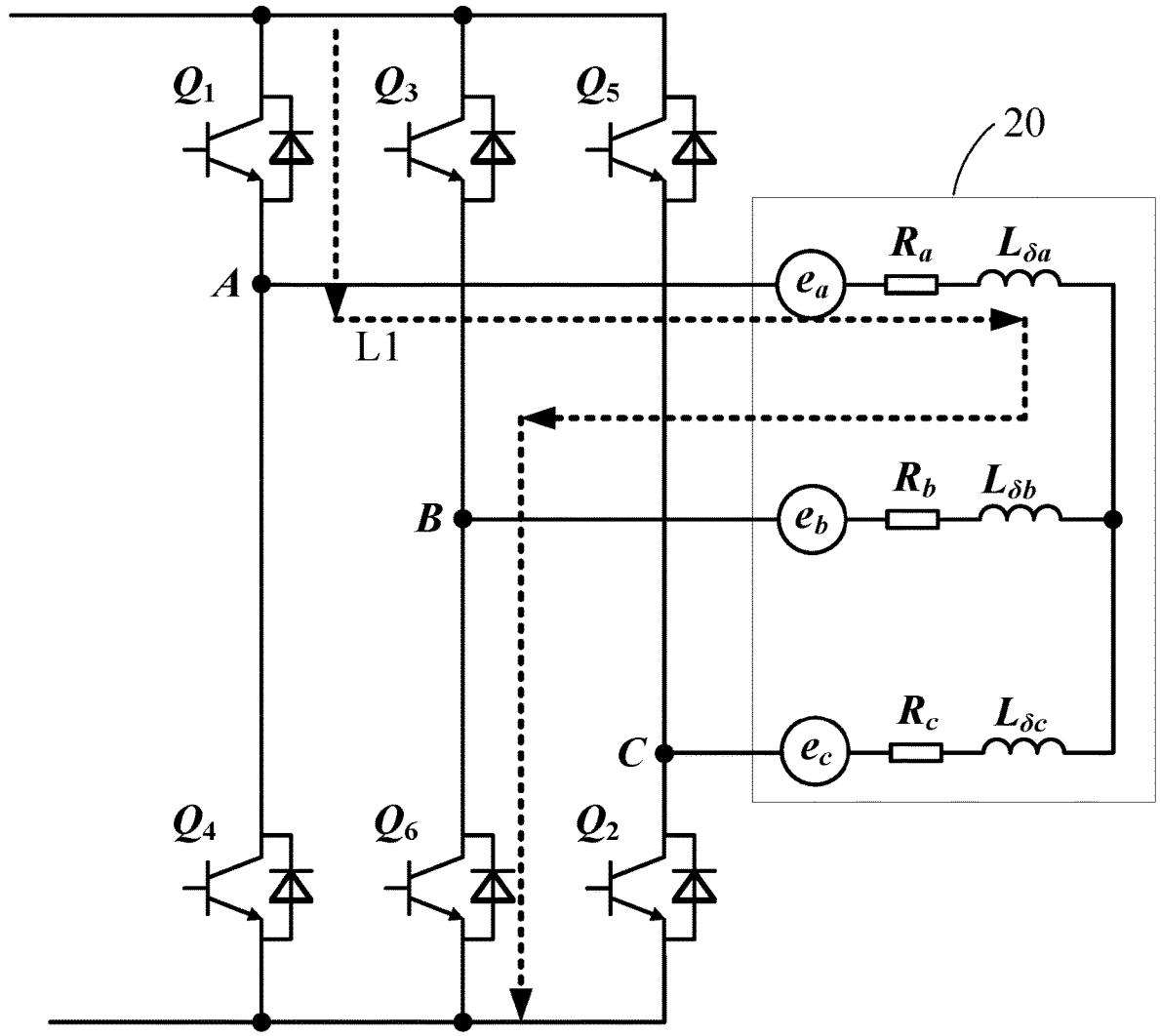
FIG. 4 is a schematic diagram showing a switch state when the electric motor is normally driven according to an example of the present application.
Figure 5:
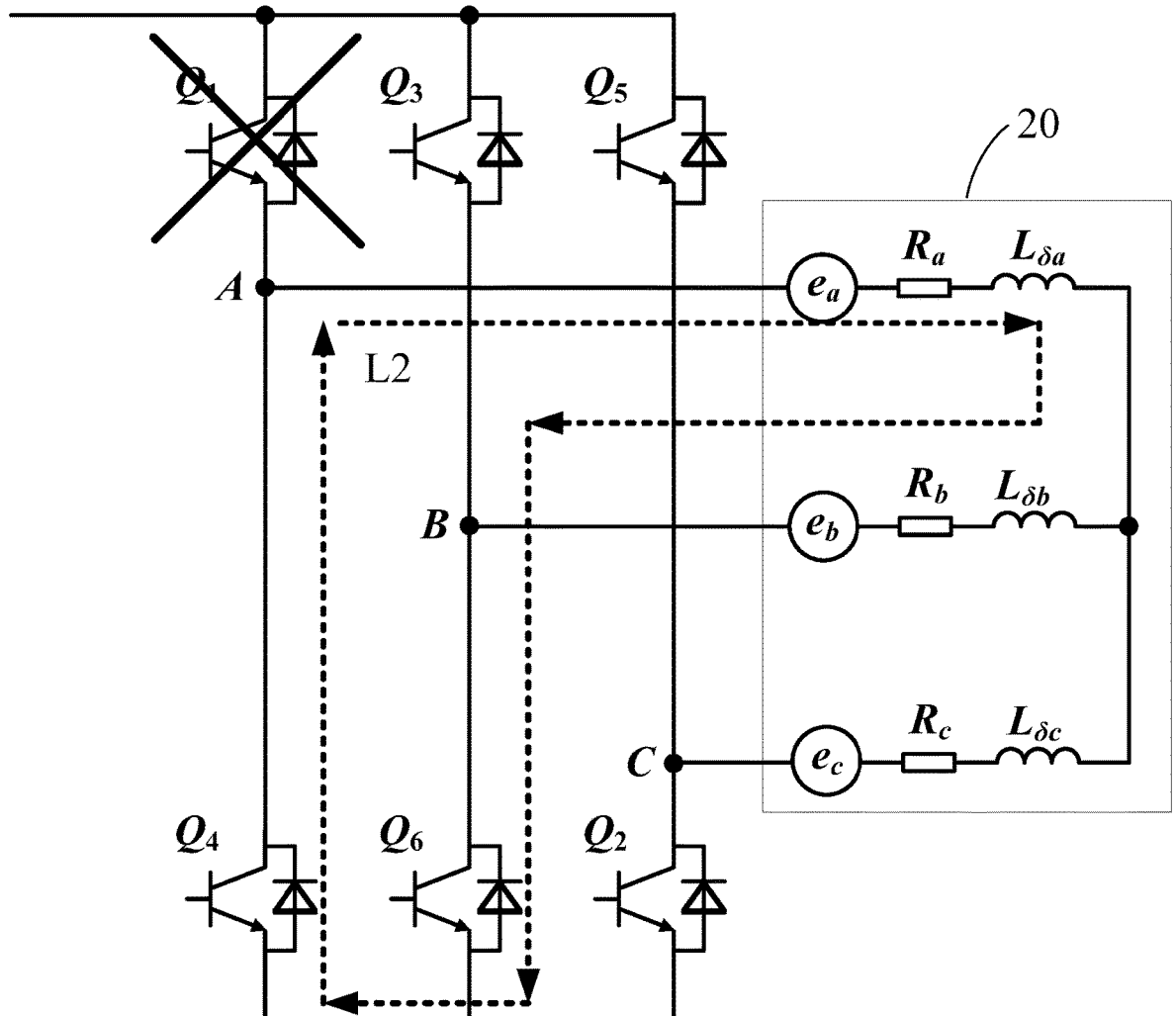
FIG. 5 is a schematic diagram showing a freewheeling state of an electric motor in a switch state according to an example of the present application.
Figure 6:
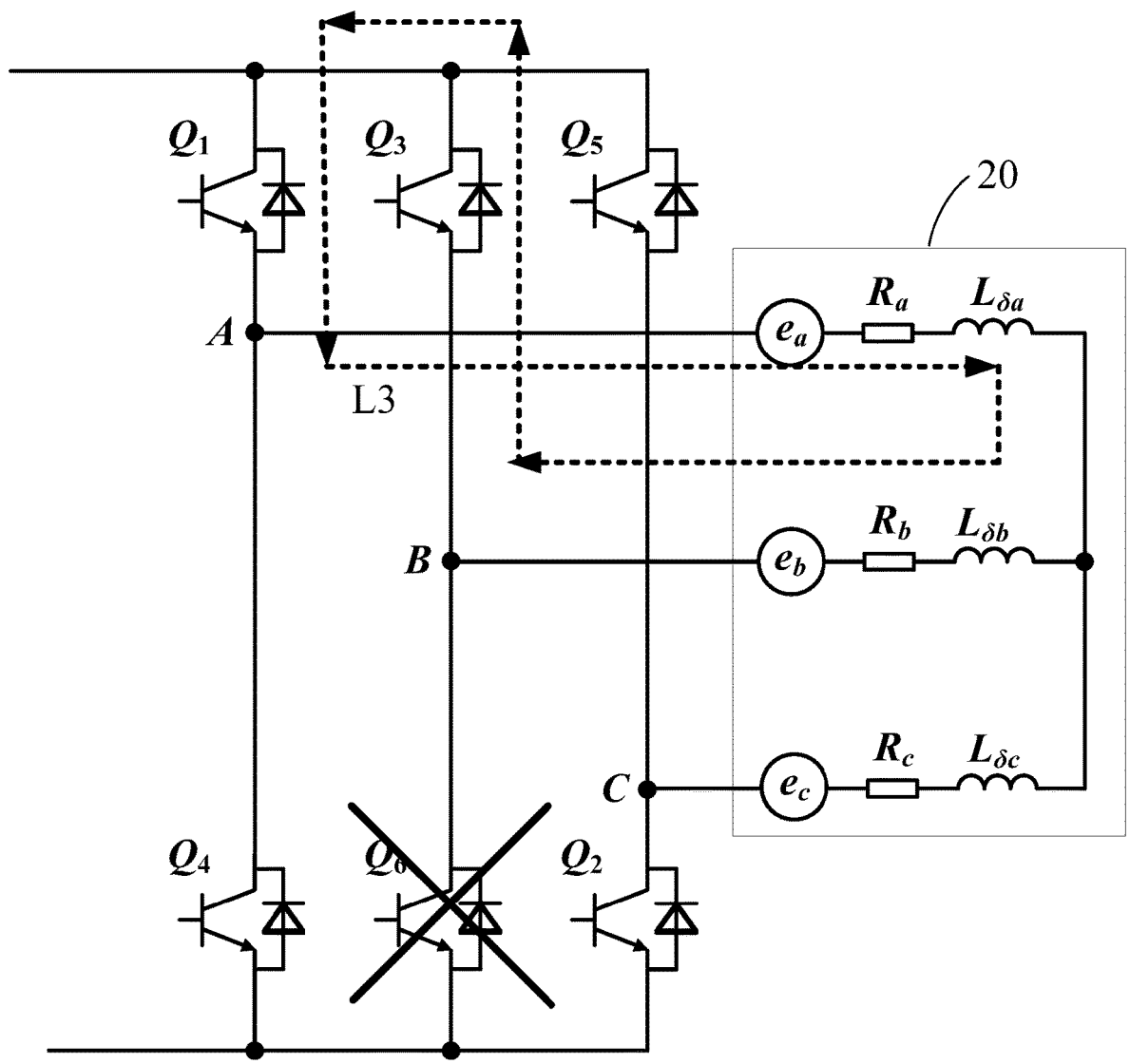
FIG. 6 is a schematic diagram showing a freewheeling state of an electric motor in a switch state according to an example of the present application.
Figure 7:
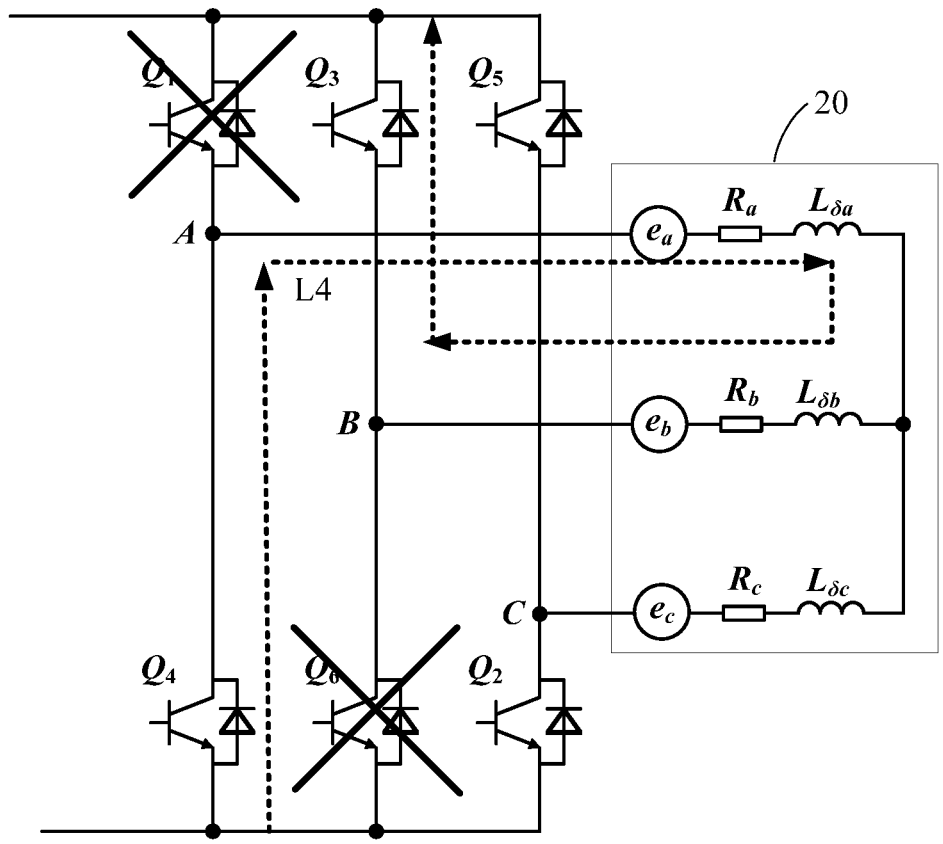
FIG. 7 is a schematic diagram showing a freewheeling state of an electric motor in a switch state according to an example of the present application.
Figure 8:
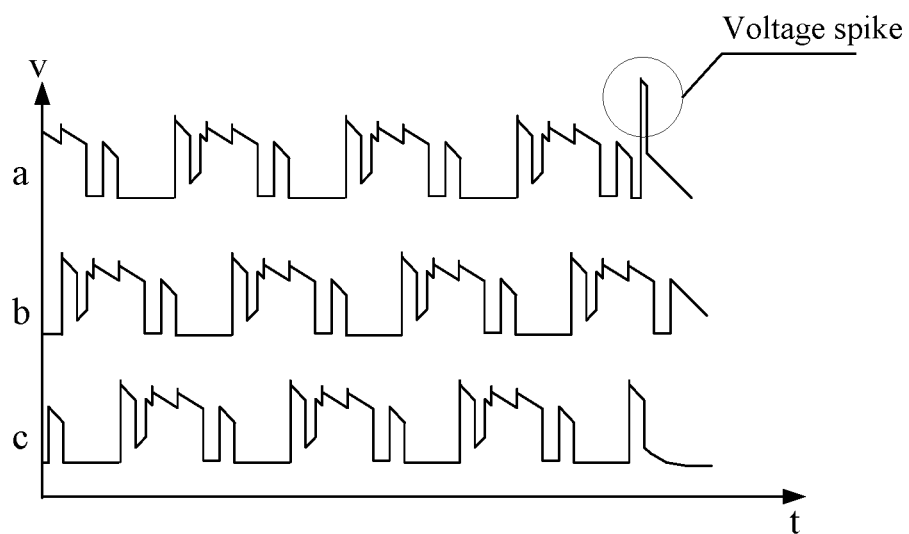
FIG. 8 is a schematic diagram showing changes of phase currents when all six ways of switches are turned off such that an electric motor is braked according to an example of the present application.

During a normal rotation of the electric motor 20, one conduction state of the driver circuit 21 is the state where a high-side switch Q1 and a low-side switch Q6 are turned on, and a current flow path is L1 as shown in FIG. 4. Assuming that the switch Q1 is turned off in the conduction state shown in FIG. 4, a freewheeling path of the current in the windings of the electric motor after Q1 is turned off is L2 shown in FIG. 5, which may be referred to as lower-bridge freewheeling. Assuming that the switch Q6 is turned off, a freewheeling path of the current in the windings of the electric motor after the switch Q6 is turned off is L3 shown in FIG. 6, which may be referred to as upper-bridge freewheeling. Assuming that all six switches in FIG. 4 are turned off, a freewheeling path of the current in the driver circuit 21 is L4 shown in FIG. 7. In this example, switches in FIGS. 5 to 7 are provided with the mark "x", which represents that the switches are switched from the previous on state to the current off state. In comparison of L2 with L4, it is known that freewheeling may be performed in the freewheeling path L2 and the freewheeling path L3 through turned-on switch elements, and all the switches in L4 are turned off and a freewheeling current freewheels along body diodes in the switch elements, which is referred to as bus freewheeling in the present application. As can be seen from FIG. 7, during the bus freewheeling, since all six ways of switches are turned off, the current freewheels along an original direction and flows towards the power supply, and the phase voltage of the electric motor is equal to the sum of the voltage of the power supply and the voltages of the inductor windings. Therefore, if locked rotor protection triggered by a locked rotor of the electric motor is to turn off the six ways of switches to brake the electric motor or a brake mode corresponding to a brake signal is to turn off the six ways of switches, a phase voltage spike shown in FIG. 8 may occur when the electric motor brakes. However, a spike voltage during the brake of the electric motor exceeds the safety voltage of the switch elements, and the power switches are easily damaged.

To avoid the phase voltage spike during the brake of the electric motor and the damage to the switch elements caused by the phase voltage spike, the controller 23 in examples of the present application may set a proper brake timing according to the electrical parameter of the electric motor to brake the electric motor so that the voltage spike is avoided during the brake of the electric motor, thereby ensuring the service life of the power tool. The brake timing may be understood as a time point, a moment, or a relatively short period when the controller 23 outputs the brake signal to brake the electric motor. The duration of this period may be time maintained by one commutation interval when the electric motor commutes.

In an example, the controller 23 may determine whether the electric motor needs to be braked and then determines the brake timing for braking the electric motor when it is determined that the electric motor needs to be braked. The scenario where the electric motor needs to be braked may be the lock of the rotor of the electric motor, over-current protection, over-temperature protection, under-voltage protection, a normal brake, or the like. Working conditions where the electric motor needs to be braked are not described in detail in the present application. It is to be noted that no bus freewheeling may be caused in some scenarios where the electric motor needs to be braked. Under these scenarios, the electric motor may be braked directly without the determination of the brake timing for braking the electric motor.

In an example, since a reversely freewheeling current is relatively strong when the rotor of the electric motor is locked and all the six ways of switches are turned off, the phase voltage spike is easily caused. The determination of the brake timing when the rotor of the electric motor is locked is described in detail in this example.

In this example, the controller 23 may determine, according to a first electrical parameter of the electric motor, whether the electric motor needs to be braked, that is, whether the rotor of the electric motor is locked. For example, the controller 23 may determine, according to the phase current, the phase voltage, output power, or the like of the electric motor, whether the rotor of the electric motor is locked. When the controller 23 determines that the rotor of the electric motor is locked, the brake timing may be determined according to a second electrical parameter. The second electrical parameter may be the rotation direction of the electric motor, the rotor position of the electric motor, or another electrical parameter according to which the commutation sequence of the windings of the electric motor can be determined.

In this example, the controller 23 may determine the commutation sequence of the stator windings and the commutation interval of the stator windings according to the rotation direction of the electric motor and the rotor position of the electric motor. As can be seen from FIG. 3, when the commutation sequence is fixed in one commutation cycle, the next commutation interval of any commutation interval is also determined. That is to say, when the commutation sequence is determined, a current commutation interval and the next commutation interval of the current commutation interval are each determined. In this example, when switching from the current commutation interval to the next commutation interval is performed, the conduction state of the high-side switch may be switched, that is, the upper-transistor switching, or the conduction state of the low-side switch may be switched, that is, the lower-transistor switching.

Figure 9:
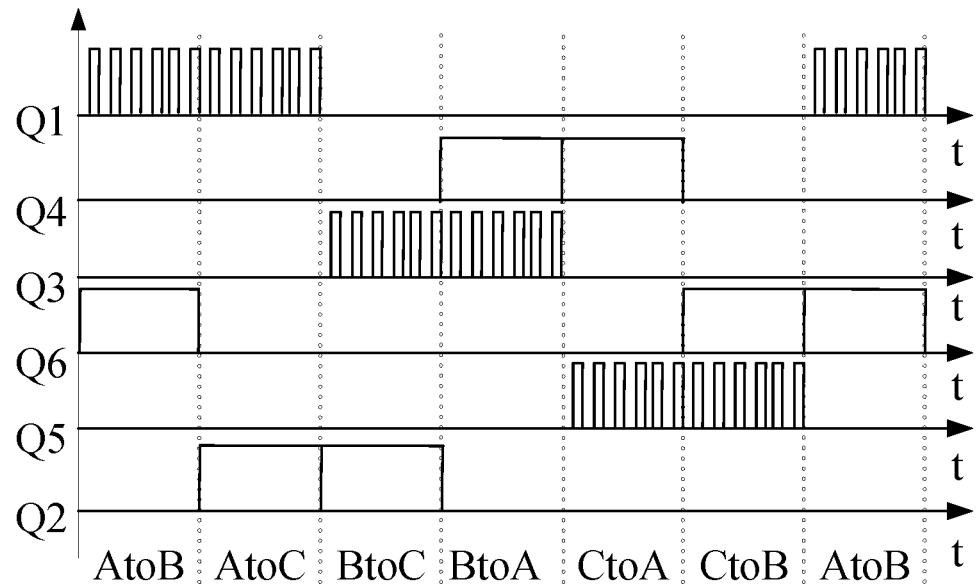
FIG. 9 is a schematic diagram showing regulation performed in a first regulation mode according to an example of the present application.
Figure 10:
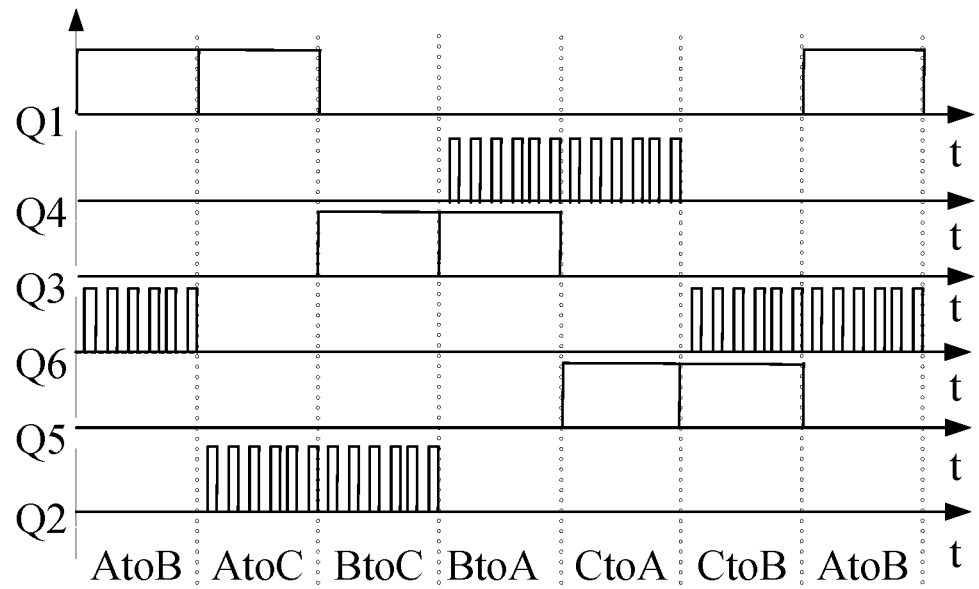
FIG. 10 is a schematic diagram showing regulation performed in a second regulation mode according to an example of the present application.

In this example, the controller 23 may determine the preceding brake timing according to the correspondence relationship between the next commutation interval and a regulation mode of the control signal. The regulation mode of the control signal may include a first regulation mode for regulating a PWM state of the high-side switch and a second regulation mode for regulating a PWM state of the low-side switch. As shown in FIG. 9, the regulation of the PWM state of the high-side switch may be understood as the process where during the control of the electric motor, the high-side switch can be controlled to be on or off by a PWM control signal outputted by the controller 23, but the low-side switch is in the on state. As shown in FIG. 10, the regulation of the PWM state of the low-side switch may be understood as the process where during the control of the electric motor, the low-side switch can be controlled to be on or off by a PWM control signal outputted by the controller 23, but the high-side switch is in the on state. In the examples of the present application, the lower-bridge freewheeling shown in FIG. 5 may occur in the first regulation mode of the control signal or the second regulation mode of the control signal, and the upper-bridge freewheeling shown in FIG. 6 may occur in the second regulation mode of the control signal or the first regulation mode of the control signal.

In an example, when the controller 23 detects that the rotor of the electric motor is locked, if the regulation mode of the control signal is the first regulation mode and the high-side switch is switched to the on/off state such that the interval switching from the current commutation interval to the next commutation interval is implemented, the controller 23 may control the electric motor to brake. The brake process of the electric motor may include a pre-brake process and a brake process. The so-called pre-brake may be the process where a PWM duty cycle is reduced first. The brake may be the process in which the six ways of switches are directly turned off so that the electric motor brakes by coasting to shut down or the process where the three-phase windings are short-circuited so that the electric motor shuts down. That is to say, when the high-side switch is controlled through PWM and the switching of the commutation interval is the upper-transistor switching, the controller 23 may directly control the electric motor to brake. In an example, the controller 23 may reduce the PWM duty cycle and then control, after a period, all the six ways of switch elements to be turned off to cause the electric motor to brake by coasting or may short-circuit the low-side switch or the high-side switch to short-circuit the three-phase windings so as to brake the electric motor such that the electric motor is controlled to brake. In this example, since the switching from the current commutation interval to the next commutation interval is the upper-transistor switching, the low-side switch is always in the on state in the current commutation interval and the next commutation interval. Even though the duty cycle of the PWM through which the conduction state of the high-side switch is controlled is immediately reduced, the lower-bridge freewheeling state similar to that shown in FIG. 5 is formed when the high-side switch is in the off state, but no voltage spike is formed during the brake. In this example, the electric motor may complete the brake in the current commutation interval or may complete the brake after commutating to the next commutation interval. The so-called completion of the brake may be understood as the end of the brake, that is, the electric motor stops rotating. It is to be understood that even though the electric motor completes the brake after commutating to the next commutation interval, no voltage spike is caused by a freewheeling current after the commutation because a freewheeling state is unchanged and the freewheeling current has been greatly reduced in the commutation interval before the commutation.

In the first regulation mode, the rotor of the electric motor is locked and the low-side switch is switched to the on/off state such that the interval switching from the current commutation interval to the next commutation interval is implemented. If the controller 23 directly reduces the duty cycle of the PWM signal to brake the electric motor, the bus freewheeling may occur in the control circuit and a freewheeling voltage spike may occur. For example, if the commutation occurs during the brake of the electric motor, the bus freewheeling may occur. To avoid the preceding case, in a first modulation mode, when the controller 23 detects that the rotor of the electric motor is locked and the conduction state of the low-side switch is switched such that the interval switching from the current commutation interval to the next commutation interval is implemented, the controller 23 may forcibly control the windings of the electric motor to commute from the current commutation interval to the next commutation interval and then may control the electric motor to brake. For example, the duty cycle of the PWM signal is reduced after the windings of the electric motor are forced to commute to the next commutation interval, or the PWM duty cycle is reduced, and the brake by coasting or the brake by short-circuiting is performed after a preset period. In an example, to avoid the case where the duty cycle is immediately reduced after the forced commutation so that the freewheeling voltage spike occurs, the windings of the electric motor commute, and after a period, the electric motor may be controlled to brake. In an example, in the first regulation mode, when the controller 23 detects that the rotor of the electric motor is locked and the conduction state of the low-side switch is switched such that the interval switching from the current commutation interval to the next commutation interval is implemented, the forced commutation to the next commutation interval may not be performed, and the PWM duty cycle is reduced in the current commutation interval and the electric motor is braked to shut down. In particular, to avoid the voltage spike caused by the commutation, the controller 23 may force the electric motor not to commutate, that is, the brake of the electric motor is completed in the current commutation interval.

In an example, when the controller 23 detects that the rotor of the electric motor is locked, if the regulation mode of the control signal is the second regulation mode and the low-side switch is switched to the on/off state such that the interval switching from the current commutation interval to the next commutation interval is implemented, the controller 23 may control the electric motor to brake. For example, the PWM duty cycle may be reduced, and then the brake by coasting or the brake by short-circuiting the three-phase windings is performed. In this example, since the switching from the current commutation interval to the next commutation interval is the lower-transistor switching, the high-side switch is always in the on state in the current commutation interval and the next commutation interval. Even though the duty cycle of the PWM through which the conduction state of the low-side switch is controlled is immediately reduced, the lower-bridge freewheeling state similar to that shown in FIG. 6 is formed when the low-side switch is in the off state, but no voltage spike is formed during the brake. In this example, the electric motor may complete the brake in the current commutation interval or may complete the brake after commutating to the next commutation interval.

In the second regulation mode, the rotor of the electric motor is locked and the high-side switch is switched to the on/off state such that the interval switching from the current commutation interval to the next commutation interval is implemented. If the controller 23 directly reduces the duty cycle of the PWM signal to brake the electric motor, the bus freewheeling may occur in the control circuit. The reason is the same as the reason why the bus freewheeling occurs in the first modulation mode, and the details are not repeated here. To avoid the preceding bus freewheeling and the preceding voltage spike, the controller 23 in this example can also forcibly control the windings of the electric motor to commute from the current commutation interval to the next commutation interval and then may control the electric motor to brake. Alternatively, the forced commutation to the next commutation interval is performed, and after a preset period, the electric motor is controlled to brake.

The implementation processes where different brake timings are selected in the first regulation mode according to different switching modes in which the switching from the current commutation interval to the next commutation interval is performed are described below in detail in conjunction with FIG. 3 and FIG. 9.

In one case, if the current commutation interval is AC, the next commutation interval is BC and the interval switching from the commutation interval AC to the commutation interval BC is upper-bridge switching. In the commutation interval AC, the high-side switch Q1 of a phase A can be controlled by the PWM signal, the PWM duty cycle may be 100%, and the low-side switch Q2 of a phase C is in the completely on state. In the commutation interval BC, Q2 remains completely on, a high-side switch Q3 of a phase B may be controlled by the PWM signal, and the PWM duty cycle may be 100%. If the rotor of the electric motor is locked in the commutation interval AC, the PWM duty cycle may be directly reduced. Thus, Q1 is in the on state and the electric motor is driven normally, Q1 is in the off state and the driving of the electric motor stops, and PWM lower-bridge freewheeling exists in the circuit. Even though the commutation from the commutation interval AC to the commutation interval BC is performed, the lower-bridge freewheeling also exists in the circuit because the lower-bridge Q2 of the phase C is maintained in the on state, and the bus freewheeling does not occur. Therefore, there is no voltage spike. In general, if the switching from the current commutation interval to the next commutation interval is the upper-bridge switching, when the rotor of the electric motor is locked in the current commutation interval, the electric motor may be directly controlled to brake, that is, the PWM duty cycle is reduced, and then the brake by short-circuiting or the brake by coasting is performed after a period. In this example, during the brake of the electric motor, the PWM duty cycle is reduced for a period so that the freewheeling current can be reduced. Then, the brake by short-circuiting or the brake by coasting is performed, and no freewheeling voltage spike is caused.

In another case, if the current commutation interval is BC, the next commutation interval is BA and the switching from the commutation interval BC to the commutation interval BA is lower-bridge switching. In the commutation interval BC, the high-side switch Q3 of the phase B can be controlled by the PWM signal, the PWM duty cycle may be 100%, and the low-side switch Q2 of the phase B is in the completely on state. In the commutation interval BA, the high-side switch Q3 of the phase B remains capable of being controlled by the PWM signal, and a low-side switch Q4 of the phase A is in the completely on state. Assuming that the rotor of the electric motor is locked in the commutation interval BC, if the duty cycle of the PWM signal is directly reduced, the PWM lower-bridge freewheeling occurs in the control circuit when the PWM is off, and if no commutation to the commutation interval BA is performed and the electric motor can be braked to stop rotating in the current interval, no freewheeling voltage spike occurs. In general, however, when the rotor of the electric motor is locked, the current is relatively strong, and the duration of the brake of the electric motor exceeds the duration of one commutation interval. That is, after the rotor is locked, it is very difficult to make the electric motor stop rotating in one commutation interval through the reduction of the PWM duty cycle and the brake by short-circuiting or the brake by coasting, and the commutation typically occurs during the brake of the electric motor. Therefore, when the rotor of the electric motor is locked in the commutation interval BC, the electric motor may be controlled to forcibly commute to the next interval BA. In an example, since the next commutation interval of BA is CA and the commutation from the interval BA to the interval CA is the upper-bridge switching, reference may be made to the brake mode of the electric motor in the interval AC, where the PWM duty cycle is reduced and then the brake by coasting or the brake by short-circuiting is performed. That is, after the electric motor is controlled to forcibly commutate from BC to BA, the PWM duty cycle may be reduced so that the electric motor is braked. However, during the commutation from BC to BA, the upper-bridge freewheeling occurs. If the PWM duty cycle is reduced at once after the commutation, the bus freewheeling occurs when the high-side switch Q3 of the phase B is off, and the freewheeling voltage spike may occur. Therefore, the electric motor commutes to the interval BA, and after a preset period, the electric motor is controlled to brake, that is, the PWM duty cycle is reduced, and the brake by short-circuiting or the brake by coasting is performed after the reduction of the duty cycle. The preset period may be time when the stator windings freewheel during the commutation or time when the switches in the driver circuit freewheel. Alternatively, the preset period may be slightly shorter than freewheeling time during the commutation. For example, the preset period is longer than or equal to 300 microseconds and shorter than or equal to 500 microseconds. For example, the preset period may be 300 microseconds, 350 microseconds, 400 microseconds, 450 microseconds, or 500 microseconds.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A power tool, comprising:
an electric motor comprising a rotor and multi-phase stator windings;
a plurality of power switches arranged between a power interface and the electric motor and comprising a plurality of high-side switches and a plurality of low-side switches;
a parameter detection device configured to detect an electrical parameter of the electric motor; and
a controller configured to at least output a control signal to control the plurality of power switches, control the electric motor to brake, determine, according to a first electrical parameter, whether the electric motor needs to be braked, determine a brake timing according to a second electrical parameter when it is determined that the electric motor needs to be braked, and start controlling the electric motor to brake when the brake timing arrives,
wherein the second electrical parameter comprises at least a rotation direction of the electric motor and a rotor position of the electric motor, and
wherein the controller is configured to determine a commutation sequence of the multi-phase stator windings and a commutation interval of the multi-phase stator windings according to the rotation direction and the rotor position, determine a next commutation interval of the commutation interval based on the commutation sequence, and determine the brake timing according to a correspondence relationship between a switching mode in which switching to the next commutation interval is performed and a regulation mode of the control signal.

2. The power tool according to claim 1, wherein the second electrical parameter is different from the first electrical parameter.

3. The power tool according to claim 1, wherein the first electrical parameter comprises a phase current, a phase voltage, or output power of the electric motor.

4. The power tool according to claim 1, wherein the regulation mode comprises a first regulation mode for regulating a pulse-width modulation (PWM) state of a high-side switch among the plurality of high-side switches and a second regulation mode for regulating a PWM state of a low-side switch among the plurality of low-side switches.

5. The power tool according to claim 4, wherein the controller is configured to control the electric motor to brake when the regulation mode is the first regulation mode and the high-side switch is switched to an on/off state such that the interval switching from the commutation interval to the next commutation interval is implemented.

6. The power tool according to claim 4, wherein the controller is configured to control the electric motor to commute to the next commutation interval when the regulation mode is the first regulation mode and the low-side switch is switched to an on/off state such that the interval switching from the commutation interval to the next commutation interval is implemented, and brake the electric motor after a preset period.

7. The power tool according to claim 6, wherein the preset period is a freewheeling time during commutation of the stator windings.

8. The power tool according to claim 4, wherein the controller is configured to control the electric motor to brake when the regulation mode is the second regulation mode and the low-side switch is switched to an on/off state such that the interval switching from the commutation interval to the next commutation interval is implemented.

9. The power tool according to claim 4, wherein the controller is configured to control the electric motor to commute to the next commutation interval when the regulation mode is the second regulation mode and the high-side switch is switched to an on/off state such that the interval switching from the commutation interval to the next commutation interval is implemented, and brake the electric motor after a preset period.

10. The power tool according to claim 9, wherein the preset period is shorter than a freewheeling time during commutation of the stator windings.

11. The power tool according to claim 1, wherein a brake operation with which the controller controls the electric motor to brake comprises at least one of reducing a duty cycle of the control signal, controlling a stator winding among the multi-phase stator windings to be short-circuited so as to cause the electric motor to brake, and controlling the plurality of power switches to be turned off so as to cause the electric motor to brake by coasting.

12. The power tool according to claim 1, wherein the brake timing comprises a time point, a moment, or a period when the controller outputs a brake signal to brake the electric motor.

13. A power tool, comprising:
an electric motor comprising a rotor and multi-phase stator windings;
a plurality of power switches arranged between a power interface and the electric motor and comprising a plurality of high-side switches and a plurality of low-side switches;
a parameter detection device configured to detect a rotation direction of the electric motor and a rotor position of the electric motor; and
a controller configured to at least output a control signal to control the plurality of power switches, control the electric motor to brake, determine a commutation sequence of the multi-phase stator windings and a commutation interval of the multi-phase stator windings according to the rotation direction and the rotor position, determine a next commutation interval of the commutation interval based on the commutation sequence, determine a brake timing of the electric motor according to a correspondence relationship between a switching mode in which switching to the next commutation interval is performed and a regulation mode of the control signal, and start controlling the electric motor to brake when the brake timing arrives.

14. The power tool according to claim 13, wherein the regulation mode comprises a first regulation mode for regulating a pulse-width modulation (PWM) state of a high-side switch among the plurality of high-side switches and a second regulation mode for regulating a PWM state of a low-side switch among the plurality of low-side switches.

15. The power tool according to claim 14, wherein the controller is configured to control the electric motor to brake when the regulation mode is the first regulation mode and the high-side switch is switched to an on/off state such that the interval switching from the commutation interval to the next commutation interval is implemented.

16. The power tool according to claim 14, wherein the controller is configured to control the electric motor to commute to the next commutation interval when the regulation mode is the first regulation mode and the low-side switch is switched to an on/off state such that the interval switching from the commutation interval to the next commutation interval is implemented, and brake the electric motor after a preset period.

17. The power tool according to claim 14, wherein the controller is configured to control the electric motor to brake when the regulation mode is the second regulation mode and the low-side switch is switched to an on/off state such that the interval switching from the commutation interval to the next commutation interval is implemented.

\* \* \* \* \*